US012637131B2

(12) United States Patent

Dziak

(10) Patent No.: US 12,637,131 B2
(45) Date of Patent: May 26, 2026

(54) REINFORCED FOLDABLE HUB WITH POSITIVE PROFILE SHIFT AND INTEGRATED STOP AND LOCKING MECHANISMS

(71) Applicant: Baby Jogger, LLC, Atlanta, GA (US)

(72) Inventor: Dan Dziak, Alpharetta, GA (US)

(73) Assignee: Baby Jogger, LLC, Atlanta, GA (US)

( * ) Notice: Subject to any disclaimer, the term of this patent is extended or adjusted under 35 U.S.C. 154(b) by 344 days.

(21) Appl. No.: 18/466,997

(22) Filed: Sep. 14, 2023

(65) Prior Publication Data

US 2024/0109576 A1      Apr. 4, 2024

Related U.S. Application Data

(60) Provisional application No. 63/377,879, filed on Sep. 30, 2022.

(51) Int. Cl.
*B62B 7/06*          (2006.01)

(52) U.S. Cl.
CPC .................................. *B62B 7/062* (2013.01)

(58) Field of Classification Search
CPC . B62B 7/062; B62B 2205/18; B62B 2205/20; B62B 7/00; B62B 7/06; B62B 9/00
See application file for complete search history.

(56) References Cited

U.S. PATENT DOCUMENTS

| | | | | |
|---|---|---|---|---|
| 7,632,035 B2* | 12/2009 | Cheng | ........................ | B62B 7/08 |
| | | | | 403/98 |
| 8,226,110 B2* | 7/2012 | Liao | ........................ | B62B 7/064 |
| | | | | 280/47.38 |
| 8,517,412 B2* | 8/2013 | Tsai | .......................... | B62B 7/08 |
| | | | | 280/647 |
| 8,714,581 B2* | 5/2014 | Fritz | ........................ | B62B 9/245 |
| | | | | 280/643 |
| 9,193,373 B2* | 11/2015 | Fjelland | .................... | B62B 7/10 |
| 9,216,755 B2* | 12/2015 | Eisinger | .................. | B62B 5/065 |
| 10,173,710 B1* | 1/2019 | Cheng | ..................... | B62B 7/062 |
| 10,399,589 B2* | 9/2019 | Horst | ........................ | B62B 7/08 |
| 11,027,763 B2* | 6/2021 | Liao | ........................ | B62B 7/062 |

(Continued)

FOREIGN PATENT DOCUMENTS

CN          104442978 A  *  3/2015  ............... B62B 7/08

*Primary Examiner* — James A Shriver, II
*Assistant Examiner* — Ian Bryce Shelton
(74) *Attorney, Agent, or Firm* — Eversheds Sutherland (US) LLP

(57) ABSTRACT

A folding hub system is provided. The folding hub includes a pinion implementing a positive profile shift to increase the strength and torque transmission of the pinion in a rack and pinion system. In addition, the foldable hub incorporates a steel rear leg plate having an integrated hard stop mechanism to prevent over rotation of the foldable components of the foldable hub, while increasing the strength and overall durability of the foldable hub in a simplified manner. Moreover, the foldable hub includes an unlock plate and tapered lock pin system, such that when the unlock plate is actuated, a cam path of the unlock plate causes the tapered lock pin to transition from a locked state to an unlocked state where the foldable hub may be transitioned from an unfolded configuration to a folded configuration.

19 Claims, 11 Drawing Sheets

(56)     References Cited

U.S. PATENT DOCUMENTS

| | | | | |
|---|---|---|---|---|
| 11,685,418 | B2 * | 6/2023 | Zhang | B62B 7/083 |
| | | | | 280/642 |
| 2003/0085551 | A1 * | 5/2003 | Allen | B62B 7/062 |
| | | | | 280/642 |
| 2006/0071451 | A1 * | 4/2006 | Cheng | F16C 11/10 |
| | | | | 280/642 |
| 2011/0084467 | A1 * | 4/2011 | Liao | B62B 7/062 |
| | | | | 280/642 |
| 2013/0140797 | A1 * | 6/2013 | Fritz | B62B 7/06 |
| | | | | 280/649 |
| 2013/0147162 | A1 * | 6/2013 | Hsu | B62B 7/062 |
| | | | | 280/647 |
| 2014/0008895 | A1 * | 1/2014 | Lee | B62B 7/08 |
| | | | | 280/647 |
| 2017/0313337 | A1 * | 11/2017 | Horst | B62B 7/044 |
| 2018/0065655 | A1 * | 3/2018 | Leys | B62B 7/064 |
| 2018/0194385 | A1 * | 7/2018 | Yuan | B62B 9/26 |
| 2018/0362065 | A1 * | 12/2018 | Cheng | B62B 7/062 |
| 2020/0283051 | A1 * | 9/2020 | Liao | B62B 7/062 |
| 2021/0387659 | A1 * | 12/2021 | Zhang | B62B 7/083 |
| 2022/0169297 | A1 * | 6/2022 | Pujol | B62B 7/062 |

* cited by examiner

REINFORCED FOLDABLE HUB WITH POSITIVE PROFILE SHIFT AND INTEGRATED STOP AND LOCKING MECHANISMS

CROSS-REFERENCE TO RELATED APPLICATION

This application claims the benefit of U.S. Application Ser. No. 63/377,879, filed Sep. 30, 2022, the entirety of which is hereby incorporated by reference.

TECHNICAL FIELD

The present disclosure relates generally to foldable hubs for, e.g., strollers, namely, steel-reinforced hubs incorporating a pinion with positive profile shift and integrated stop and locking mechanisms.

BACKGROUND

Current geared hub designs utilize a curved or arced rack and pinion system, which provide a near zero backlash design without the need to spread apart the larger gear's teeth to make the number of teeth an integer. Such a design improves the strength of the larger gear as there is more contact of gear teeth during the fold/unfold motion; however, issues may arise when transmitting torque through the pinion as the pinion gear is generally made from a material that is weaker than the other gear teeth. A need remains for a simplified geared folding hub with an overall improved system strength.

Figure 1A:
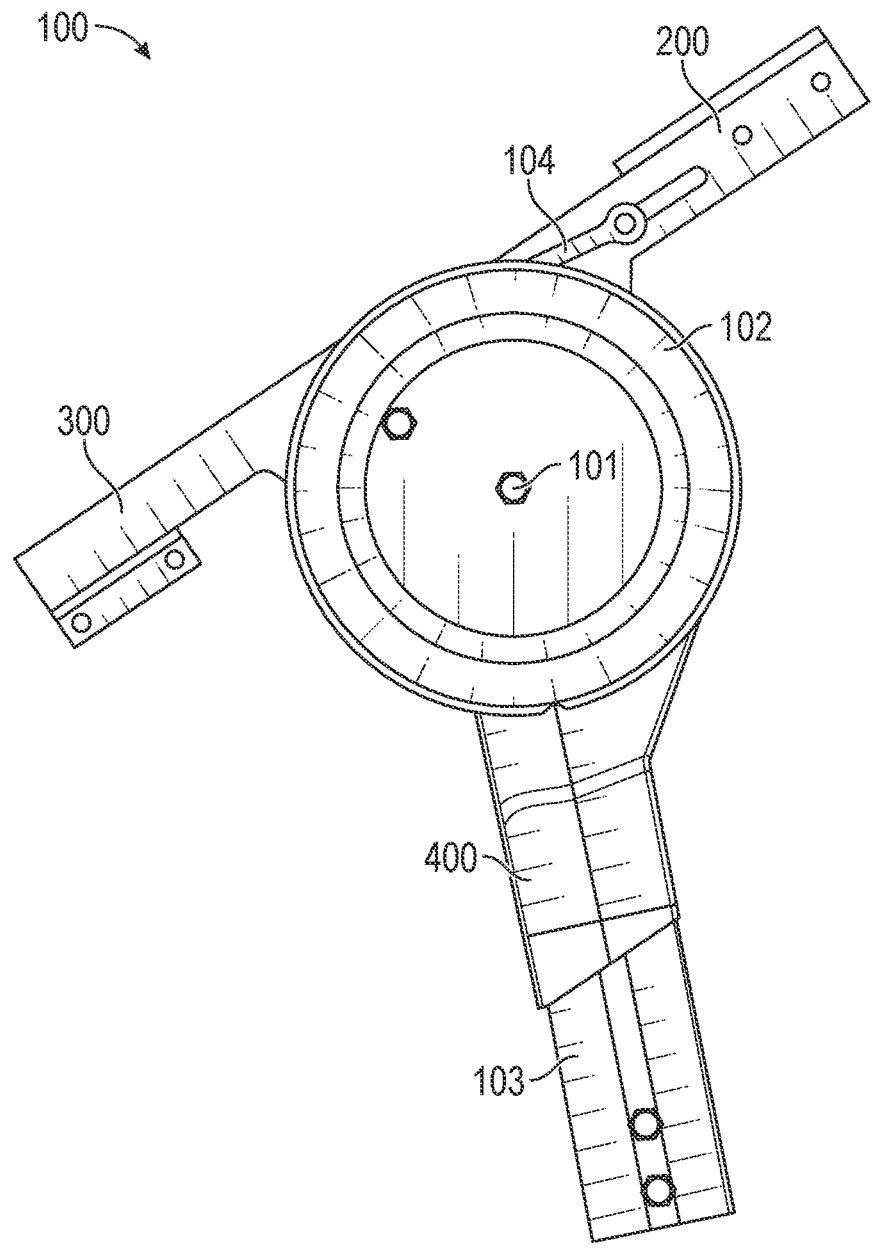
FIG. 1A illustrates the exterior of a foldable hub constructed in accordance with the principles of the present disclosure.

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. The use of the same reference numerals indicates similar, but not necessarily the same or identical components. Different reference numerals may be used to identify similar components. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

The geared fold hub designs described herein solves the problem of creating a strong reliable stroller fold hub by implementing a positive profile shift in the pinion, simplifying the overall assembly, and incorporating a steel plate for extra support. The fold hub is stronger and less complex than current geared hubs on current strollers.

The present disclosure provides various features that make up the fold hub. For example, one feature implements a positive profile shift on the pinion to increase the strength and/or allowable torque that may be transmitted via the pinion. A second feature utilizes steel rear leg plate to increase the strength and overall durability of the fold hub in a simplified manner. A third feature incorporates the over rotation hard stops into the steel rear leg plate to eliminate the need for extra hardware to act as the hard stop. In addition, another feature includes an unlock plate and taper lock pin system. For example, as a trigger operatively coupled to the unlock plate is actuated, the unlock plate rotates along a synchronized cam path, such that a first part of the rotation releases the taper lock pin, allowing it to move down, and then a second part of the rotation provides a cam path to force the pin to an unlocked state.

By designing the gear system with a shorter than actual center-to-center distance between the axis of the hub and the axis of the pinion, the positive gear profile shift may be implemented to increase the width of each gear tooth and strengthen the pinion. In addition, by incorporating a steel plate in the rear leg coupled to the hub, the overall design may be simplified while strengthening the hub-to-rear leg connection, as opposed to current designs which utilize a glass-filled nylon housing to connect the hub to the rear leg. Moreover, the steel plate may disposed within the nylon housing and include integrated bent tabs for hard-stopping over rotation of the hub components, which is a simplified improvement over current systems that require a separate screw and bushing system to act as a hard stop for over rotation.

Figure 1B:
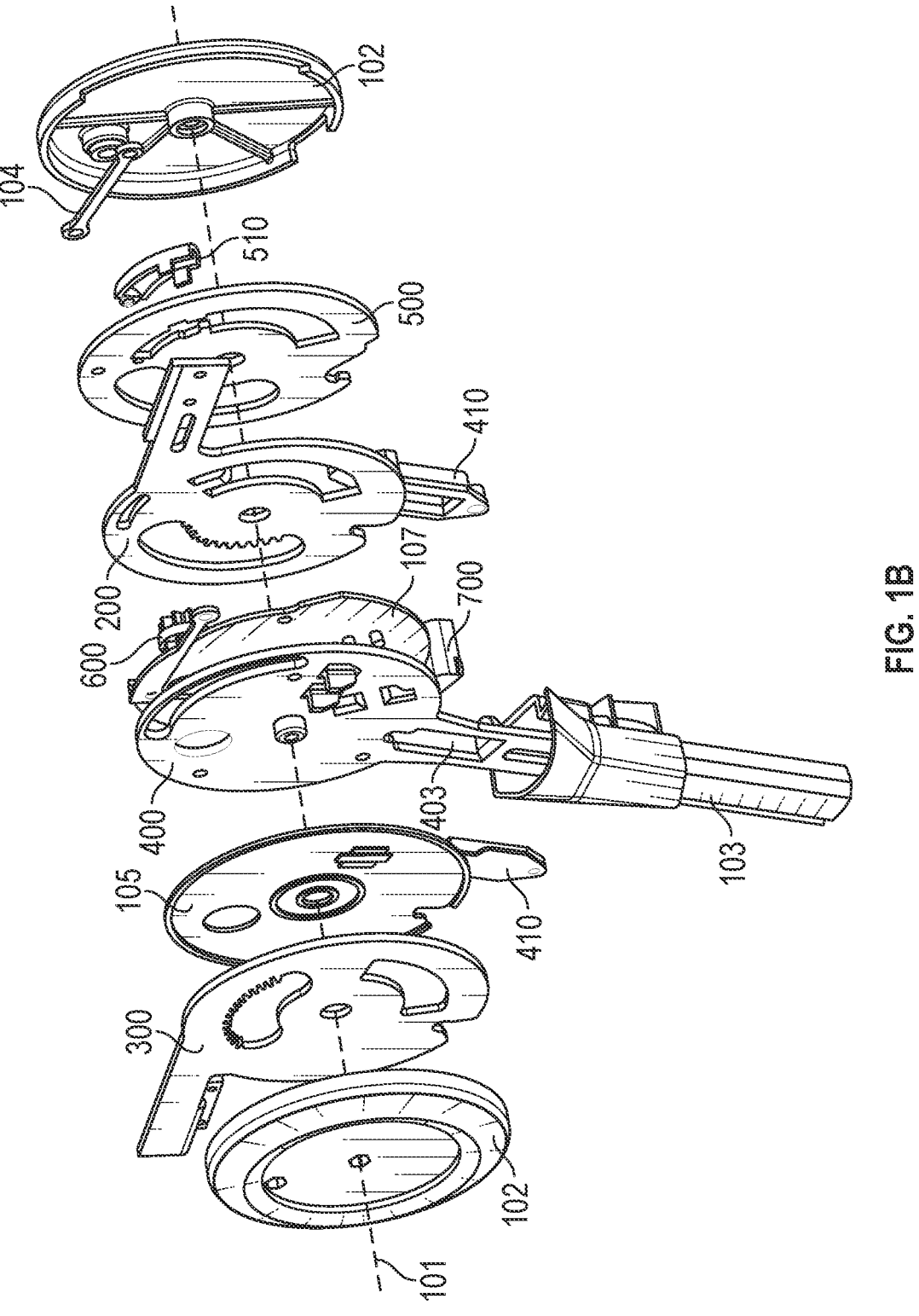
FIGS. 1B and 1C are exploded views of the foldable hub of FIG. 1A.
Figure 1C:
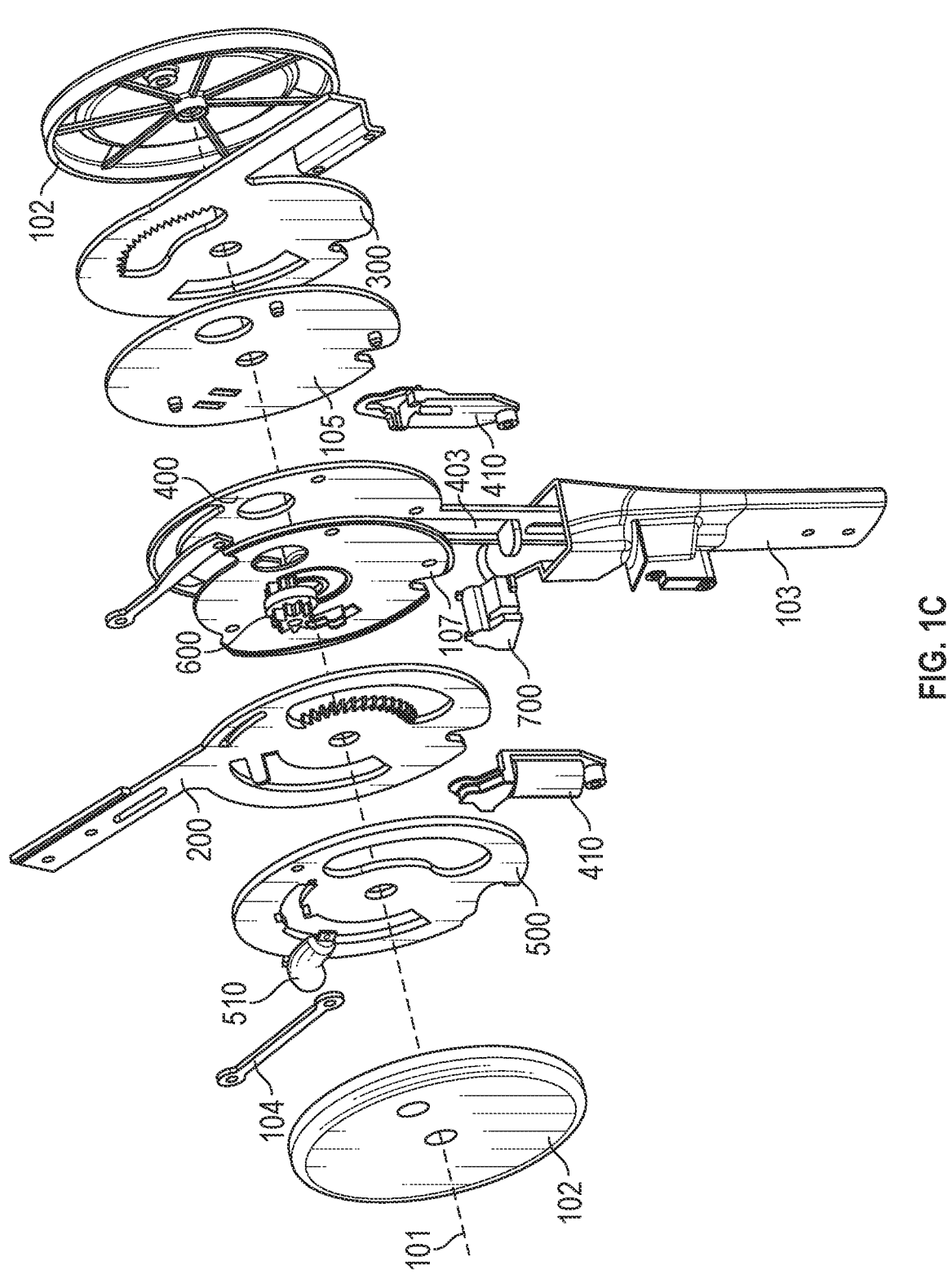

Referring now to FIGS. 1A to 1C, a foldable hub is provided. Foldable hub 100 may be incorporated in, e.g., a stroller, or other devices that may benefit from being folded from a utility configuration to a compact, transport and/or storage configuration. As shown in FIG. 1A, foldable hub 100 may include hub housing 102, and at least a first plate, e.g., handle plate 200, a second plate, e.g., front leg plate 300, and a third plate, e.g., rear leg plate 400, all of which extend from hub housing 102. Handle plate 200 may extend from hub housing 102 toward, e.g., a handle of a stroller. Front leg plate 300 may extend from hub housing 102 toward, e.g., a front leg of a stroller, which may further be coupled to one or more wheels. As shown in FIG. 1A, rear leg plate 400 may be made of, e.g., steel or other strong metal, and may be disposed within rear leg housing 103, e.g., a housing formed of a material such as plastic including nylon or other material, which extends from hub housing 102 toward, e.g., a rear leg of a stroller, which further be coupled to one or more wheels. As will be understood by a person having ordinary skill in the art, when foldable hub 100 is incorporated in a stroller, the stroller may include two oppositely facing foldable hubs, each coupled to a front leg of a pair of front legs, a rear leg of a pair of rear legs, and a handle shaft of a pair of handle shafts that are joined together to form a horizontal handle of the stroller. Accordingly, the stroller may be folded from an expanded configuration to collapsed configuration via the pair of foldable hubs, as described in further detail below.

As shown in FIGS. 1B and 1C, foldable hub 100 may include a series of plates concentrically coupled together about axis 101, and enclosed within a pair of hub housings 102. For example, foldable hub 100 may include in series front leg plate 300, rear leg plate 400, handle plate 200, and unlock plate 500. Additional plates may be utilized to separate one or more of the aforementioned plates, e.g., to reduce friction between the plates. For example, as shown in FIGS. 1B and 1C, plate 105 may be positioned between front leg plate 300 and rear leg plate 400, and plate 107 may be positioned between rear leg plate 400 and handle plate 200. Each of plates 200, 300, 400, 500, 105, and 107 may have a circular profile portion that corresponds with the circular shape of hub housing 102, such that the plates may be rotatably disposed within hub housing 102 about axis 101.

Figure 2A:
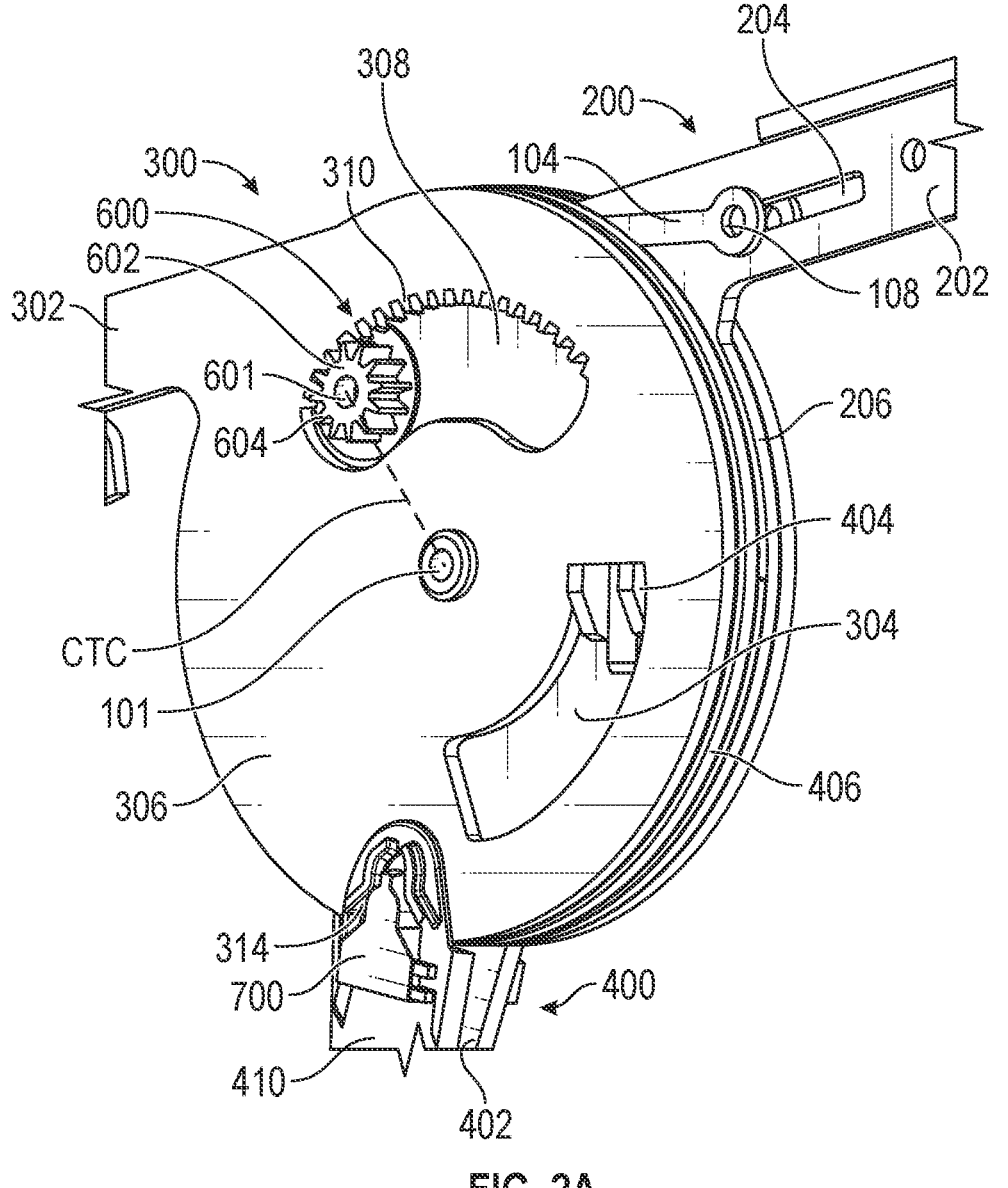
FIGS. 2A and 2B illustrate opposite sides of the interior of the foldable hub of FIG. 1A.
Figure 2B:
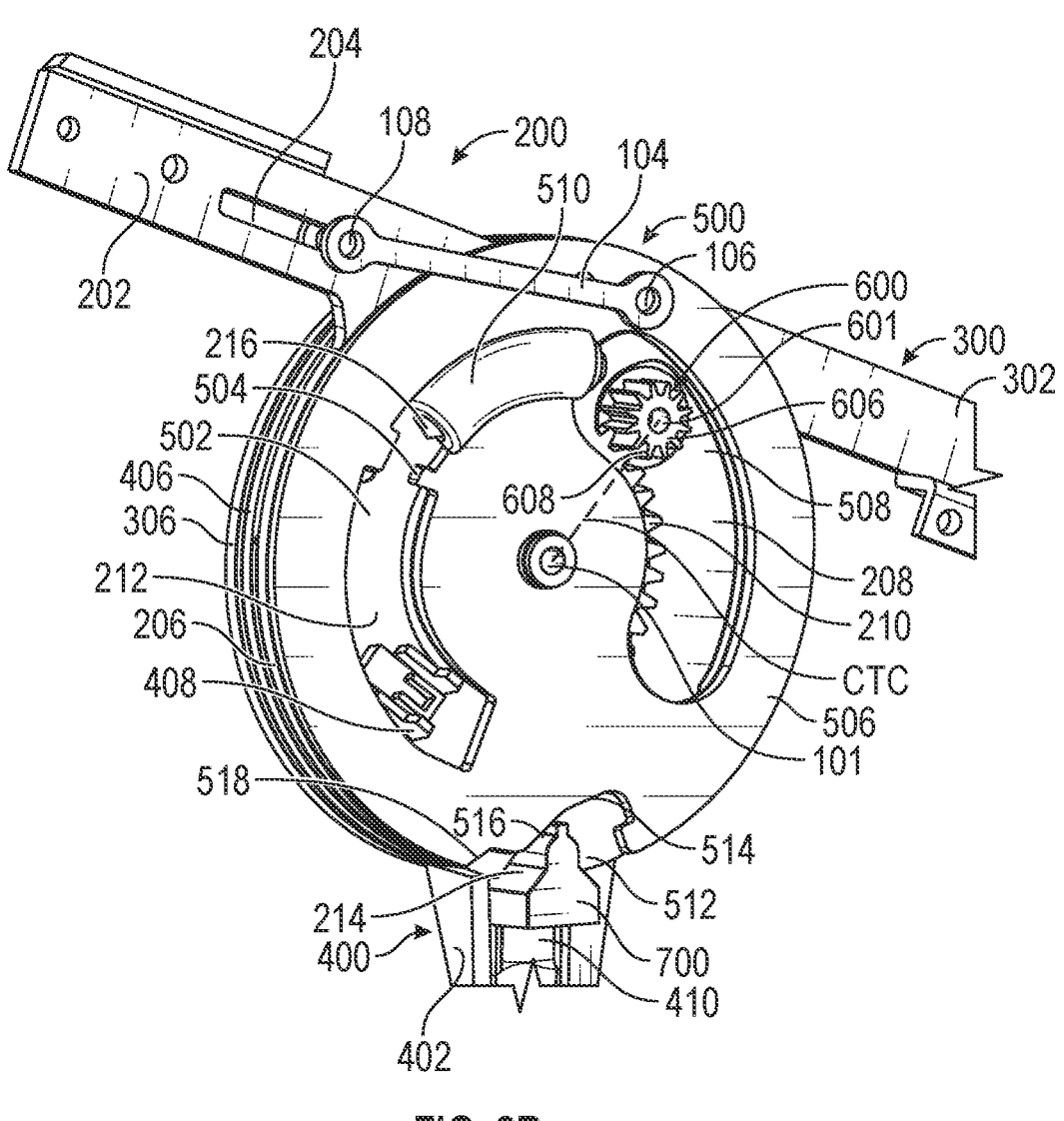
Figure 5A:
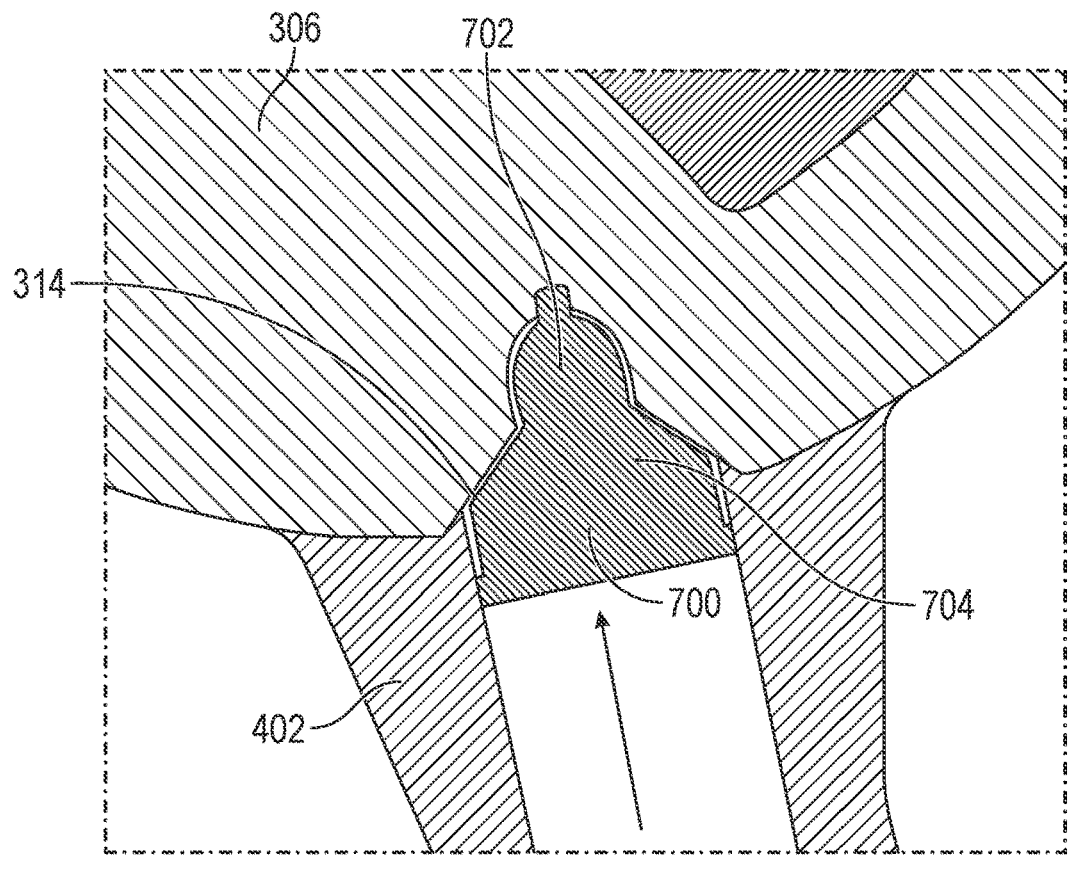
FIGS. 5A and 5B illustrate the locking pin in a locked position in accordance with the principles of the present disclosure.

Referring now to FIGS. 2A and 2B, the interior of the foldable hub without the housing hub is provided. FIG. 2A shows a first side of the interior of foldable hub 100, e.g., a front side, and FIG. 2B shows a second side of the interior of foldable hub 100 opposite to the first side, e.g., a back side. As shown in FIG. 2A, front leg plate 300 may include extended portion 302 extending from circular portion 306, e.g., toward the front leg of the stroller. Accordingly, extended portion 302 may form at least a part of the front leg of the stroller. In addition, circular portion 306 may include opening 304 defining a curved shape, and sized and shaped to slidably receive and provide a rotation path for hard stop tabs 404 of rear leg plate 400, as described in further detail below. Circular portion 306 further may include opening 308 defining a curved shape, and sized and shaped to slidably receive and provide a rotation path for one or more pinions, e.g., pinion 600. Opening 308 further defines rack 310, e.g., a series of teeth, extending along at least a circumferentially extending edge of opening 308. As shown in FIG. 2A, rack 310 may extend along the outermost circumferentially extending edge of opening 308. In addition, front leg plate 300 may include groove 314 extending inward from an outer edge of circular portion 306, and having a shape corresponding to locking pin 700 (FIG. 5A).

As shown in FIG. 2B, handle plate 200 may include extended portion 402 extending from circular portion 406, e.g., toward the handle of the stroller. Accordingly, extended portion 402 may form at least a part of the handle shafts coupled to and/or forming the handle of the stroller. Moreover, extended portion 402 may include opening 204 sized and shaped to slidably receive distal end 108 of connection bar 104. Proximal end 106 of connection bar 104 may be coupled to unlock plate 500, such that upon actuation, e.g., via a trigger on the handle of the stroller, distal end 108 is moved distally along opening 204 to thereby cause unlock plate 500 to rotate in a counter-clockwise direction (in the direction of movement of distal end 108) and unlock locking pin 700, as described in further detail below.

Figure 5B:
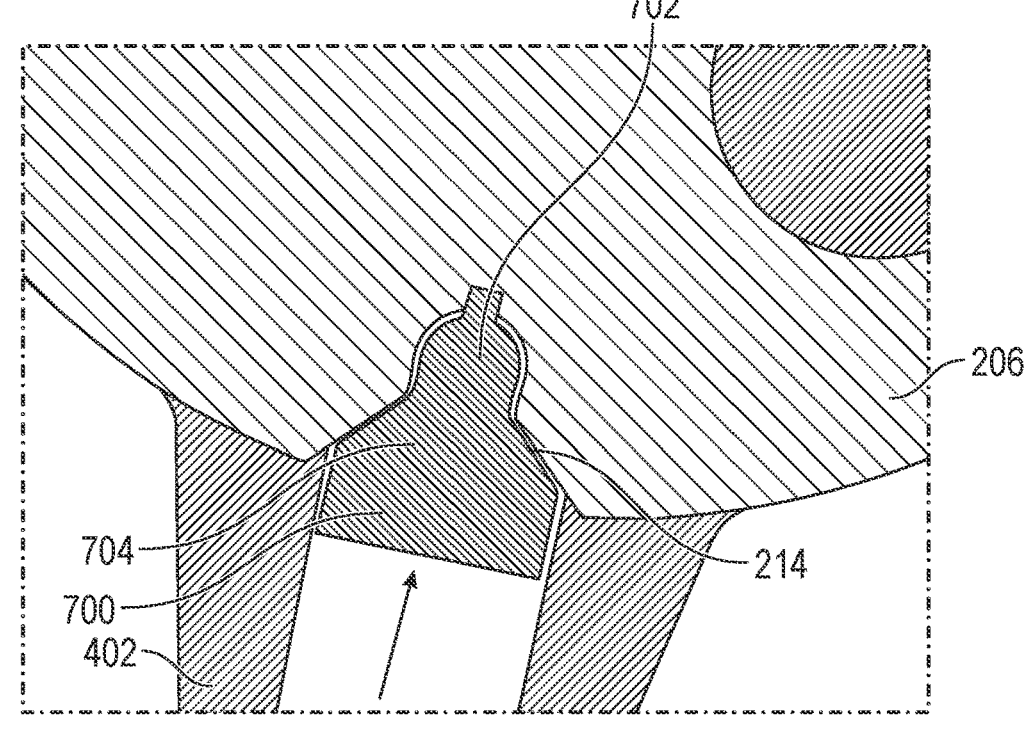

In addition, circular portion 206 may include opening 212 defining a curved shape, and sized and shaped to slidably receive and provide a rotation path for hard stop tabs 408 of rear leg plate 400, as described in further detail below. Circular portion 206 further may include opening 208 defining a curved shape, and sized and shaped to slidably receive and provide a rotation path for one or more pinions, e.g., pinion 600. Opening 208 further defines rack 210, e.g., a series of teeth, extending along at least a circumferentially extending edge of opening 208. As shown in FIG. 2A, rack 210 may extend along the innermost circumferentially extending edge of opening 208, e.g., opposite to that of rack 310 of opening 308 of front leg plate 300. Alternatively, rack 210 may extend along the outermost circumferentially extending edge of opening 208, while rack 310 extends along the innermost circumferentially extending edge of opening 308. In some embodiments, rack 210 and rack 310 may extend along both the innermost and outermost circumferentially extending edges of openings 208 and 308, respectively. In addition, handle plate 200 may include groove 214 extending inward from an outer edge of circular portion 206, and having a shape corresponding to locking pin 700 (FIG. 5B).

Referring again to FIGS. 2A and 2B, rear leg plate 400 may include extended portion 402 extending from circular portion 406, e.g., toward the rear leg of the stroller within rear leg housing 103. Accordingly, extended portion 402 may form at least a part of the rear leg of the stroller. As described above, rear leg plate 400 may be made of, e.g., steel or another durable metal, to thereby strengthen the connection between foldable hub 100 and the rear leg of the stroller. Thus, rear leg housing 103 may be formed of a cheaper material resulting in a stronger, yet less expensive folding hub. As shown in FIGS. 1B and 1C, extended portion 402 may have opening 403 sized and shaped to receive locking pin 700, as well as a compression spring coupled to locking pin 700 and configured to bias locking pin 700 in a locked position, as described in further detail below. Moreover, spring housing 410 may be coupled together to enclose the compression spring and locking pin 700, and further coupled to rear leg housing 103.

Referring again to FIG. 2A, rear leg plate 400 may include one or more front tabs 404 extending from circular portion 406. Specifically, front tabs 404 may be formed integrally with rear leg plate 400, e.g., by cutting through circular portion 406 to define the profile of tabs 404, and bending the cut out portion of circular portion 406 outwardly to form tabs 404. Tabs 404 are sized and shaped to act as a hard stop to prevent over rotation of front leg plate 300, thereby eliminating the need for separate components to act as the hard stop. For example, tabs 404 may have a front side that is tapered, and a back side that is flat to facilitate engagement with a radially extending edge of opening 304 to prevent further rotation of front leg plate 300 relative to rear leg plate 400 when the radially extending edge of opening 304 contacts tabs 404. As shown in FIGS. 1B and 1C, plate 105 may have corresponding cut outs to permit tabs 404 to pass therethrough, such that tabs 404 are positioned within opening 304 of circular portion 306 of front leg plate 300. Accordingly, plate 105 may be rotatably fixed relative to rear leg plate 400.

As shown in FIG. 2B, rear leg plate 400 further may include one or more back tabs 408 extending from circular portion 406. Like front tabs 404, back tabs 408 may be formed integrally with rear leg plate 400, e.g., by cutting through circular portion 406 to define the profile of tabs 408, and bending the cut out portion of circular portion 406 in a direction opposite to front tabs 404 to form tabs 408. Tabs 408 are sized and shaped to act as a hard stop to prevent over rotation of handle plate 200, thereby eliminating the need for separate components to act as the hard stop. For example, tabs 408 may have a front side that is tapered, and a back side that is flat to facilitate engagement with a radially extending edge of opening 212 of handle plate 200 to prevent further rotation of handle plate 200 relative to rear leg plate 400 when the radially extending edge of opening 212 contacts tabs 408. As shown in FIGS. 1B and 1C, plate 107 may have corresponding cut outs to permit tabs 408 to pass therethrough, such that tabs 408 are positioned within opening 212 of circular portion 206 of handle plate 200. Accordingly, plate 107 may be rotatably fixed relative to rear leg plate 400.

Referring again to FIG. 2B, circular portion 506 of unlock plate 500 may include opening 502 defining a curved shape, and sized and shaped to slidably receive and provide a rotation path for hard stop tabs 408 of rear leg plate 400. Accordingly, the rotation path provided by opening 502 may be aligned with the rotation path provided by opening 212 of handle plate 200 within housing hub 102. Moreover, a radially extending edge of opening 502 further may engage with the backside of tabs 408 such that further rotation of unlock plate 500 relative to rear leg plate 400 is prevented when the backside of tabs 408 engages with the radially extending edge of opening 502. As shown in FIG. 2B, circular portion 506 may further include one or more radially extending tabs 504 that define the rotation path provided by opening 502 for tabs 408. Tabs 504 are sized and shaped to engage with tabs 408, such that further rotation of unlock plate 500 relative to rear leg plate 400 is prevent upon engagement of the front side of tabs 408 with tabs 504.

In addition, circular portion 506 of unlock plate 500 may include opening 508 defining a curved shape, and sized and shaped to slidably receive and provide a rotation path for pinion 600. Accordingly, opening 508 may be aligned with opening 208 of handle plate 200. As shown in FIG. 2B, opening 508 may have a slightly larger radial width than opening 208 so as not to interfere with the engagement between pinion 600 and rack 210. Moreover, unlock plate 510 may include curved cover 510 sized and shaped to house a compression spring therein. Cover 510 may be fixedly coupled to unlock plate 500, and may extend through an extended portion of opening 502.

As shown in FIG. 2B, circular portion 206 of handle plate 200 further may include an outwardly extending tab 216 that extends into the lumen of cover 510. A first end of the compression spring within cover 510 may be coupled to cover 510 and/or unlock plate 500, and another end of the compression spring may be coupled to tab 216, such that the compression spring biases unlock plate 500 in a clockwise direction (FIG. 2B) relative to handle plate 200, e.g., in a locked configuration. In the locked configuration, distal end 108 of connection bar 104 may be positioned along opening 204 of extended portion 202 toward the proximal end of opening 204. In addition, unlock plate 500 may include groove 512 extending inward from an outer edge of circular portion 506, and having a shape that defines a cam path for transitioning locking pin 700 between a locked and an unlocked state, as described in further detail below with regard to FIGS. 6A to 6C. For example, groove 512 may be defined by locking portion 520, locked portion 514, transition portion 516, and unlocked portion 518.

As shown in FIGS. 2A and 2B, foldable hub 100 further may include one or more pinions, e.g., pinion 600. Pinion 600 may be a double-sided gear, sized and shaped to extend through at least front leg plate 300, plate 105, rear leg plate 400, plate 107, and handle plate 200, and having an axis of rotation about axis 601. For example, pinion 600 may have front side 602 having a geared outer surface 604 configured to engage with rack 310 of front leg plate 300, and a back side 606 having geared outer surface 608 configured to engage with rack 210 of handle plate 200. Accordingly, upon rotation of handle plate 200 in a first direction, rack 210 causes rotation of pinion 600 in a second direction opposite to the first direction via geared outer surface 608, which causes rotation of front leg plate 300 in the second direction via rack 310 and geared outer surface 604. As shown in FIGS. 2A and 2B, axis 601 of pinion 600 is positioned a predefined center-to-center distance CTC from axis 101 of foldable hub 100. As will be understood by a person having ordinary skill in the art, although only one pinion is shown in FIGS. 2A and 2B, more than one pinion may be used to transmit torque to the respective racks, e.g., two or three or more pinions.

Figure 3:
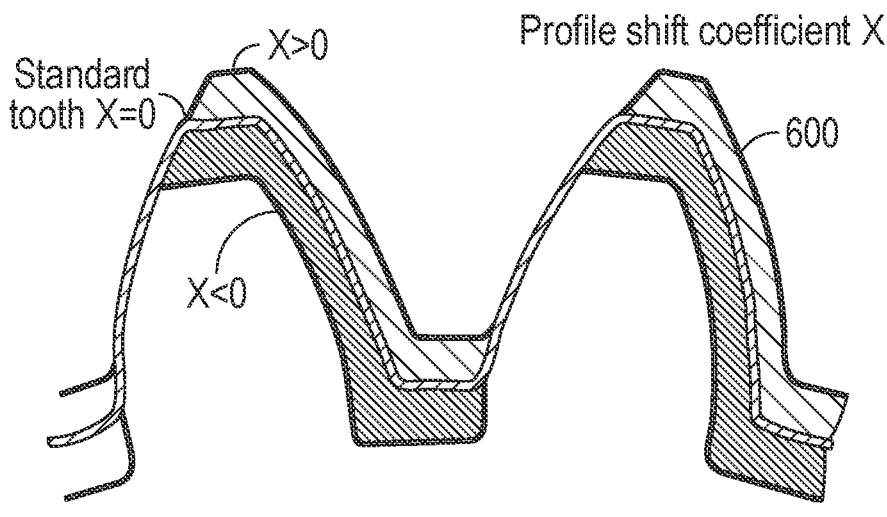
FIG. 3 illustrates a positive profile shift of a pinion in accordance with the principles of the present disclosure.

Referring now to FIG. 3, an example of profile shifting for the teeth of a gear is provided. In proper gear design, the number of teeth on a gear must be an integer, e.g., the number of teeth cannot have a decimal after it. Moreover, the distance between the two centerlines that the gears rotate about must be kept precise, otherwise there will not be proper contact between the gear teeth, which could result in the gears interfering between themselves and/or an increase in gear backlash. When center-to-center distances cannot be adjusted and the gears cannot be designed to mesh properly, profile shifting may be implemented to account for a shorter or longer center-to-center distance. For example, as shown in FIG. 3, a gear having standard teeth without any shifting is represented by the line where the profile shift coefficient $X=0$. A gear where a negative profile shift is implemented, e.g., such that the teeth are cut deeper into the gear, would have teeth having a shape represented by the line where the profile shift coefficient $X<0$. Moreover, a gear where a positive profile shift is implemented, e.g., where the profile shift coefficient $X>0$, would have teeth having a shape represented by pinion 600, such that the space between each tooth is decreased resulting in a stronger gear tooth cross section. A positive gear profile shift may be implemented in foldable hub 100 to increase the width of each gear tooth, e.g., of geared outer surface 604 and/or 608, to thereby strengthening pinion 600 by designing the gear system with a center-to-center distance between axis 101 and a hypothetical axis of pinion 600 that is shorter than the actual center-to-center distance CTC between axis 101 and axis 601.

Figure 4:
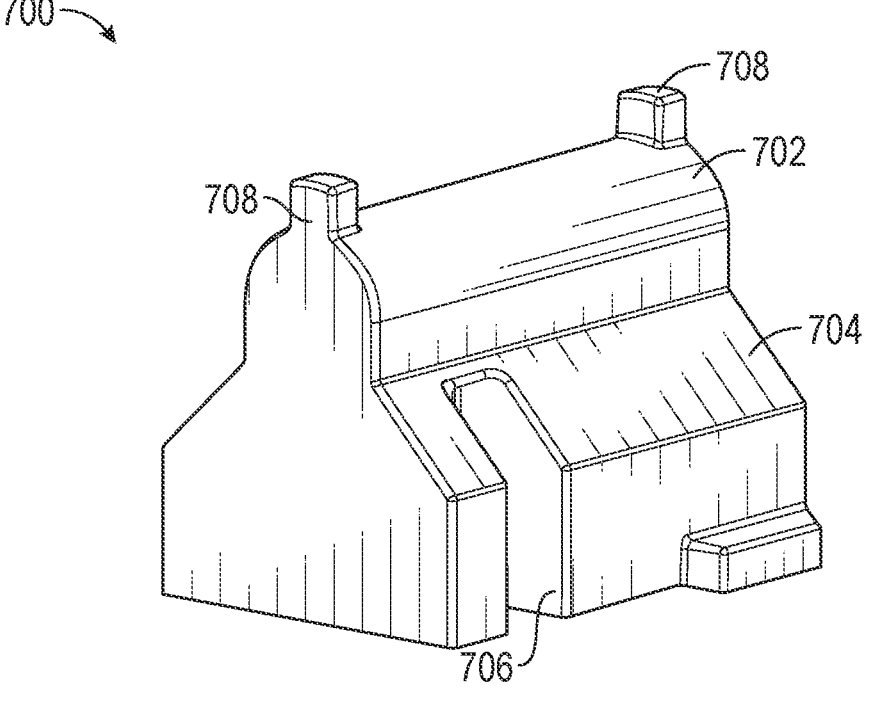
FIG. 4 illustrates a locking pin of the foldable hub constructed in accordance with the principles of the present disclosure.

Referring now to FIG. 4, locking pin 700 is provided. As shown in FIG. 4, locking pin 700 may include locking pin section 702, e.g., having a curved profile, lock section 704, e.g., having a tapered profile, unlock plate slot 706 sized and shaped to receive locking portion 520 of unlock plate 500, and optionally, one or more chimneys 708. Chimneys 708 permit spring housing 410 to be rotated into place to aid in assembly without having to add a spring force during assembly.

As shown in FIGS. 5A and 5B, groove 314 of front leg plate 300 and groove 214 of handle plate 200 each have a geometry corresponding to the profile of locking pin section 702 and tapered lock section 704, such that in the locked state, groove 314 and groove 214 are aligned, and locking pin 700 is tightly disposed within groove 314 and groove 214. Together, locking pin section 702 and tapered lock section 704 of locking pin 700 lock together leg plate 300, handle plate 200, and rear leg plate 400. The tapered profile of lock section 704 is configured to account for any looseness in the system, e.g., between front leg plate 300, handle plate 200, and/or rear leg plate 400, which reduces movement of foldable hub 100 when foldable hub 100 is in an unfolded configuration. Moreover, due to the spring force applied to locking 700 via the compression spring coupled thereto, the tapered profile of lock section 704 maintains alignment of front leg plate 300, handle plate 200, and rear leg plate 400 so they resist rotation, and locking pin section 702 prevent the plates from disengaging with tapered lock section 704.

Figures 6A, 6B, 6C:
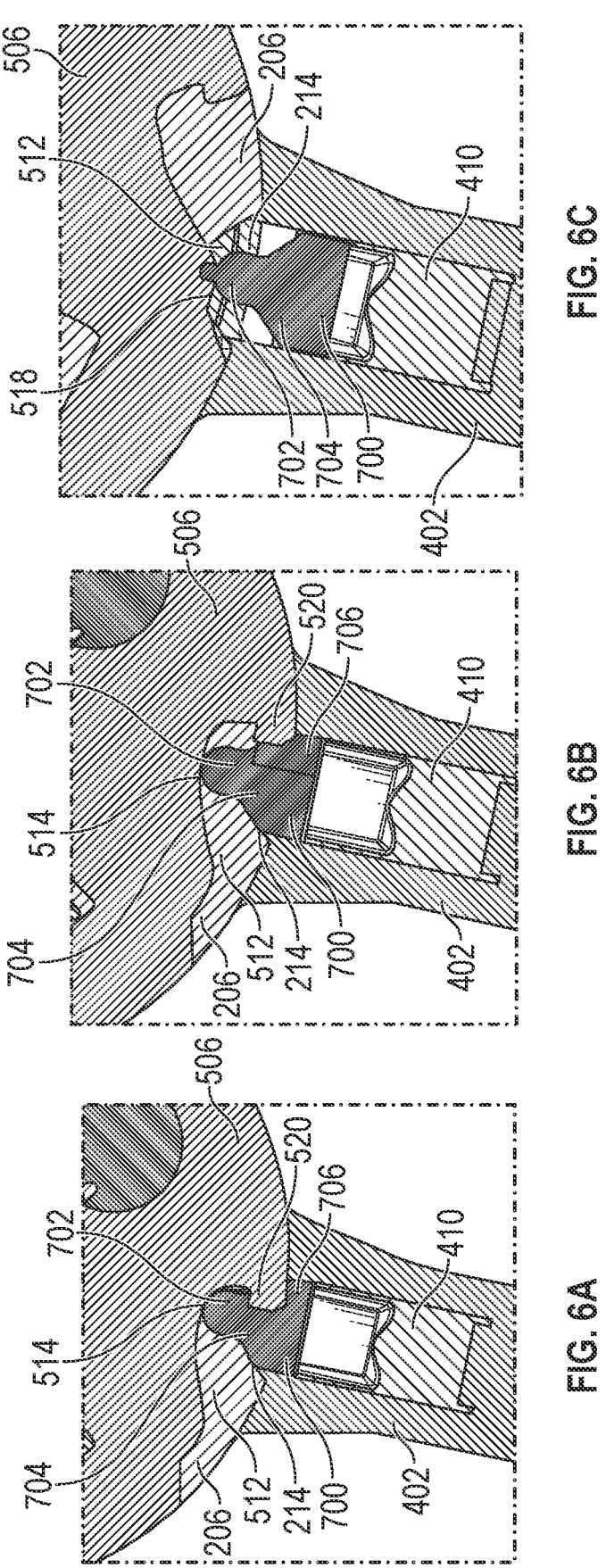
FIGS. 6A to 6C illustrate rotation of the unlock plate of the foldable hub to unlock the locking pin in accordance with the principles of the present disclosure.

Referring now to FIGS. 6A to 6C, transitioning locking pin 700 from a locked state to an unlocked state via actuation of unlock plate 500 is provided. As shown in FIG. 6A, in the locked state, groove 214 of handle plate 200 and groove 314 of front leg plate 300 are aligned and locked together from rotating via locking pin 700 disposed therein, e.g., via the spring force provided by the compression spring coupled to locking pin 700. Moreover, unlock plate 500 is in its locked configuration, which it is biased towards via the compression spring within cover 510, as described above. In its locked configuration, locking portion 520 is positioned within unlock plate slot 706 of locking pin 700 to thereby prevent downward movement of locking pin relative to unlock plate 500, front leg plate 300, handle plate 200, and rear leg plate 400. For example, locking portion 520 may have a hook shaped profile, and unlock plate slot 706 may have a corresponding geometry for receiving locking portion 520. In addition, in the locked configuration, locking pin section 702 is engaged with locked portion 514, as shown in FIG. 6A.

To fold foldable hub 100, e.g., to fold the stroller, an actuator operatively coupled to unlock plate 500, e.g., via connection bar 104, may be actuated to pull distal end 108 of connection bar distally relative to opening 204 of handle plate 200. Accordingly, proximal end 106 of connection bar 104 will cause unlock plate to rotate in a counter-clockwise direction, against the spring force of the compression spring within cover 510. As will be understood by a person having ordinary skill in the art, other actuation mechanisms may be utilized to cause rotation of unlock plate 500. As shown in FIG. 6B, as unlock plate 500 rotates in the counter-clockwise direction, the cam path defined by groove 512 of unlock plate 500 causes locking pin section 702 to slide from locked portion 514 along transition portion 516, and accordingly move downward relative to front leg plate 300, handle plate 200, and rear leg plate 400 against the spring force of the compression spring within spring housing 410, thereby causing locking pin section and tapered lock section 704 to disengage from grooves 213, 314.

As shown in FIG. 6C, as unlock plate 500 is further rotated in the counter-clockwise direction, the cam path defined by groove 512 of unlock plate 500 causes locking pin section 702 to slide along transition portion 516 towards unlocked portion 518. When locking pin section 702 is engaged with unlocked portion 518, there may be sufficient clearance of locking pin 700 from grooves 214, 314 to begin rotation of handle plate 200 and front leg plate 300 relative to rear leg plate 400, such that the rotation of handle plate 200, front leg plate 300, and unlock plate 500 causes locking pin 700 to move further downward until locking pin 700 is completely disengaged from grooves 214, 314. Accordingly, front leg plate 300, handle plate 200, and rear leg plate 400 are free to be rotated relative to each other, to thereby permit folding of foldable hub 100 from the unfolded configuration to a folded configuration.

Figures 7A, 7B:
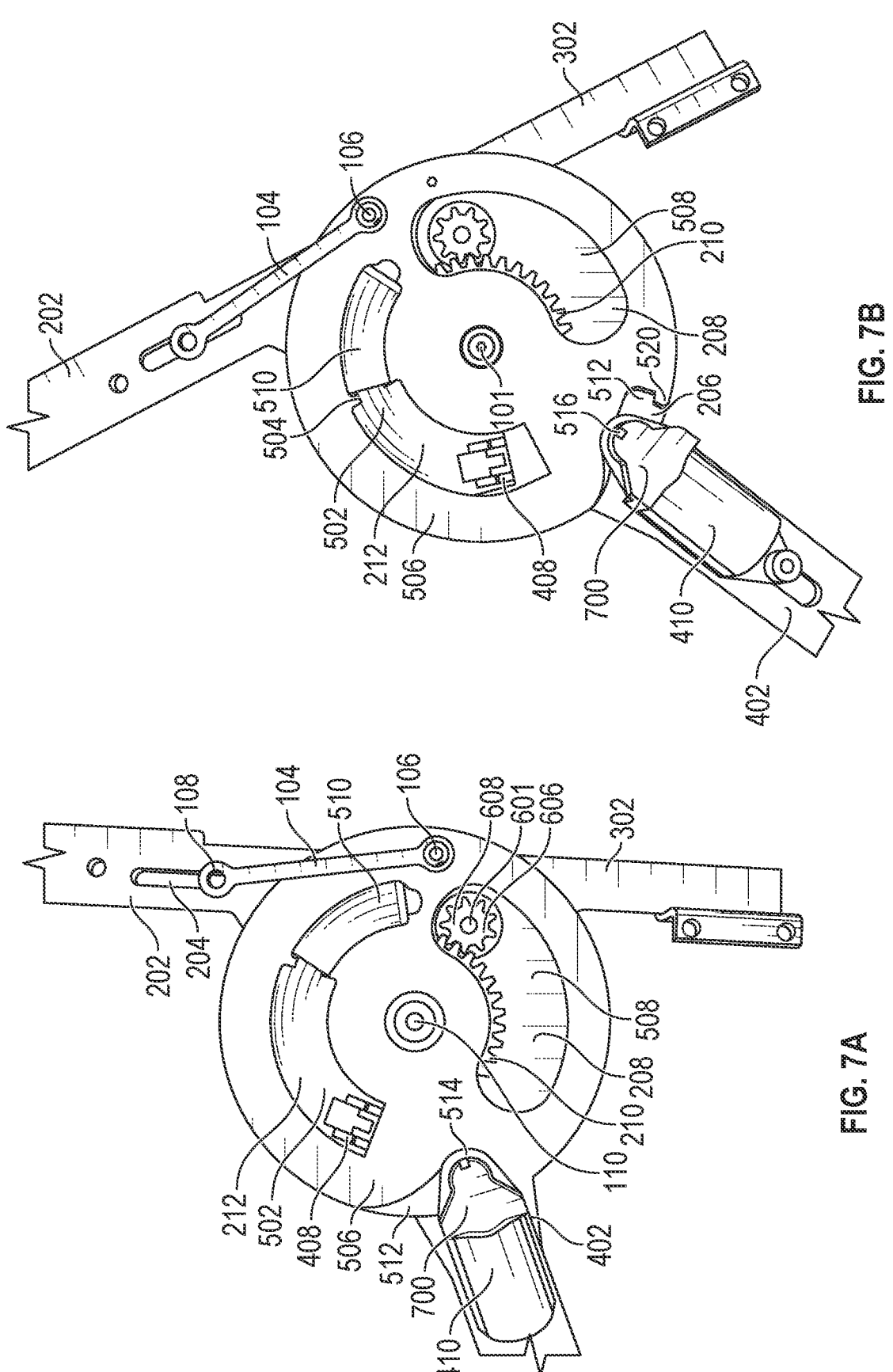
FIGS. 7A to 7F illustrate the steps of folding and unfolding the foldable hub in accordance with the principles of the present disclosure.

Referring now to FIGS. 7A to 7F, the steps of folding and unfolding folding hub 100 in accordance with the principled of the present disclosure are provided. FIG. 7A shows foldable hub 100 in an unfolded configuration. Accordingly, as described above, locking pin 700, shown in FIG. 7A within housing 410, is disposed within groove 214 of handle plate 200 and groove 314 of front leg plate 300 in its locked state, and unlock plate is in its locked configuration where locking portion 520 is engaged with unlock plate slot 706 of locking pin 700. Unlock plate 500 is prevent from further rotation in the clockwise direction due to the engagement between tabs 408 and the radially extending edge of opening 502. As shown in FIG. 7A, side 606 of pinion 600 may be disposed within openings 208, 508, such that geared outer surface 608 having a positive profile shift, is engaged with rack 210 of handle plate 200.

To transition unlock plate 500 from its locked configuration to its unlocked configuration, unlock plate 500 may be actuated to rotated in the counter-clockwise direction via, e.g., actuating an actuator to cause connection bar 104 to rotate unlock plate against the compression spring within cover 510, as shown in FIG. 7B. Accordingly, as described above, as unlock plate 500 rotates in the counter-clockwise direction, the cam path defined by opening 512 of unlock plate 500 causes locking pin 700 to slide from locked portion 514 along transition portion 516 towards unlocked portion 518 until locking pin 700 is disengaged from grooves 214, 314.

Figures 7C, 7D:
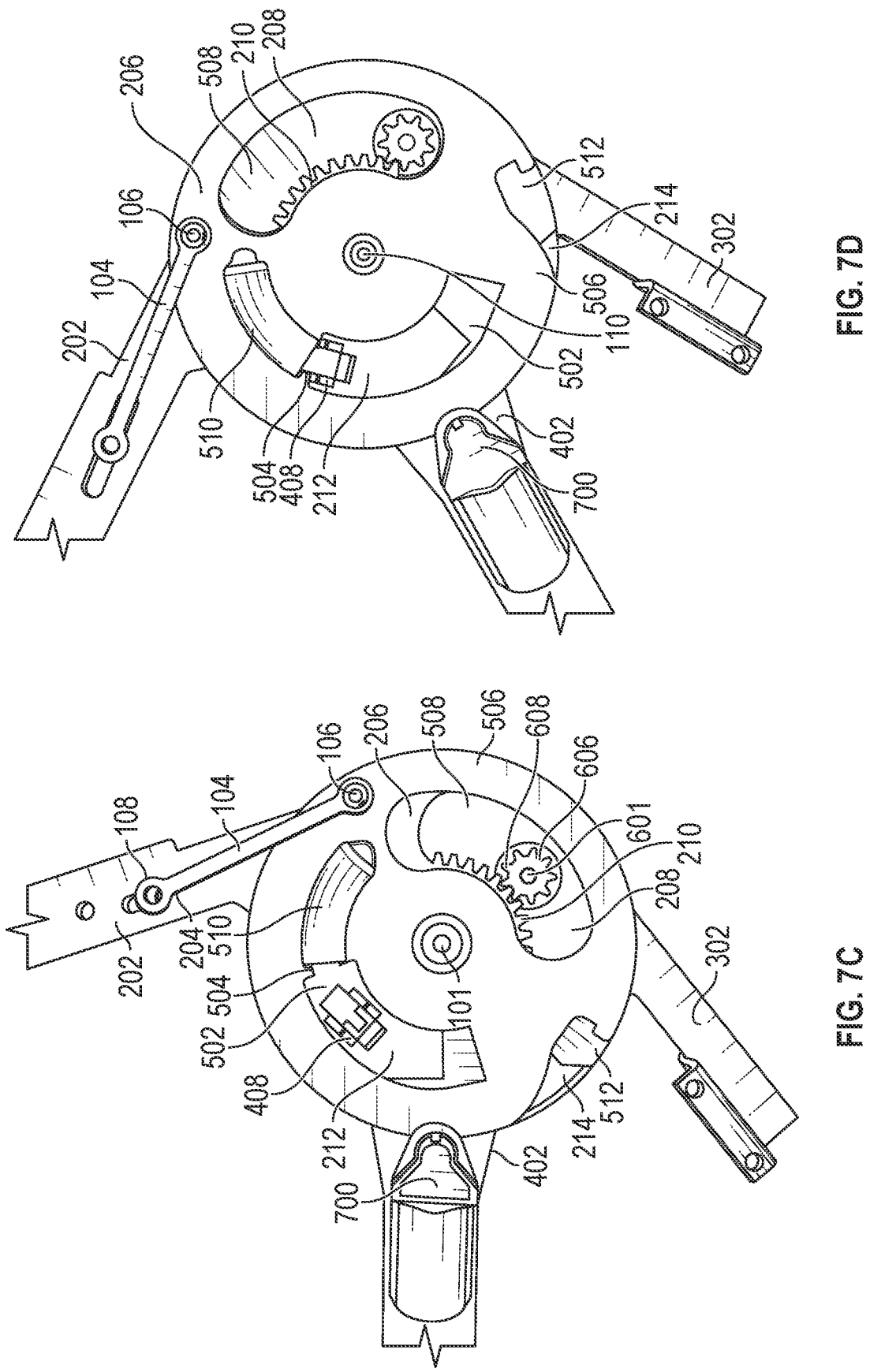

As shown in FIGS. 7C and 7D, handle plate 200 along with unlock plate 500 may be rotated in a counter-clockwise direction relative to rear leg plate 400, and front leg plate 300 may be rotated in a clockwise direction relative to rear leg plate 400 to transition folding hub 100 from the unfolded configuration to the folded configuration. As shown in FIG. 7C, as handle plate 200 and unlock plate 500 are rotated in a counter-clockwise direction relative to rear leg plate 400, tabs 408 slide in a clockwise direction within opening 502, and side 606 of pinion 600 rotates in a clockwise direction about axis 601 and in a clockwise direction about axis 101 along rack 210 via geared outer surface 608, which causes side 602 of pinion 600 to rotate in a manner along rack 310 to cause front leg plate 300 to rotate in a direction opposite to that of handle plate 200. As shown in FIG. 7D, extended portion 202 of handle plate 200 and extended portion 302 of front leg plate 300 may be rotated toward each other until tabs 408 engages with tabs 504 of unlock plate 500, as shown in FIG. 7D.

Figures 7E, 7F:
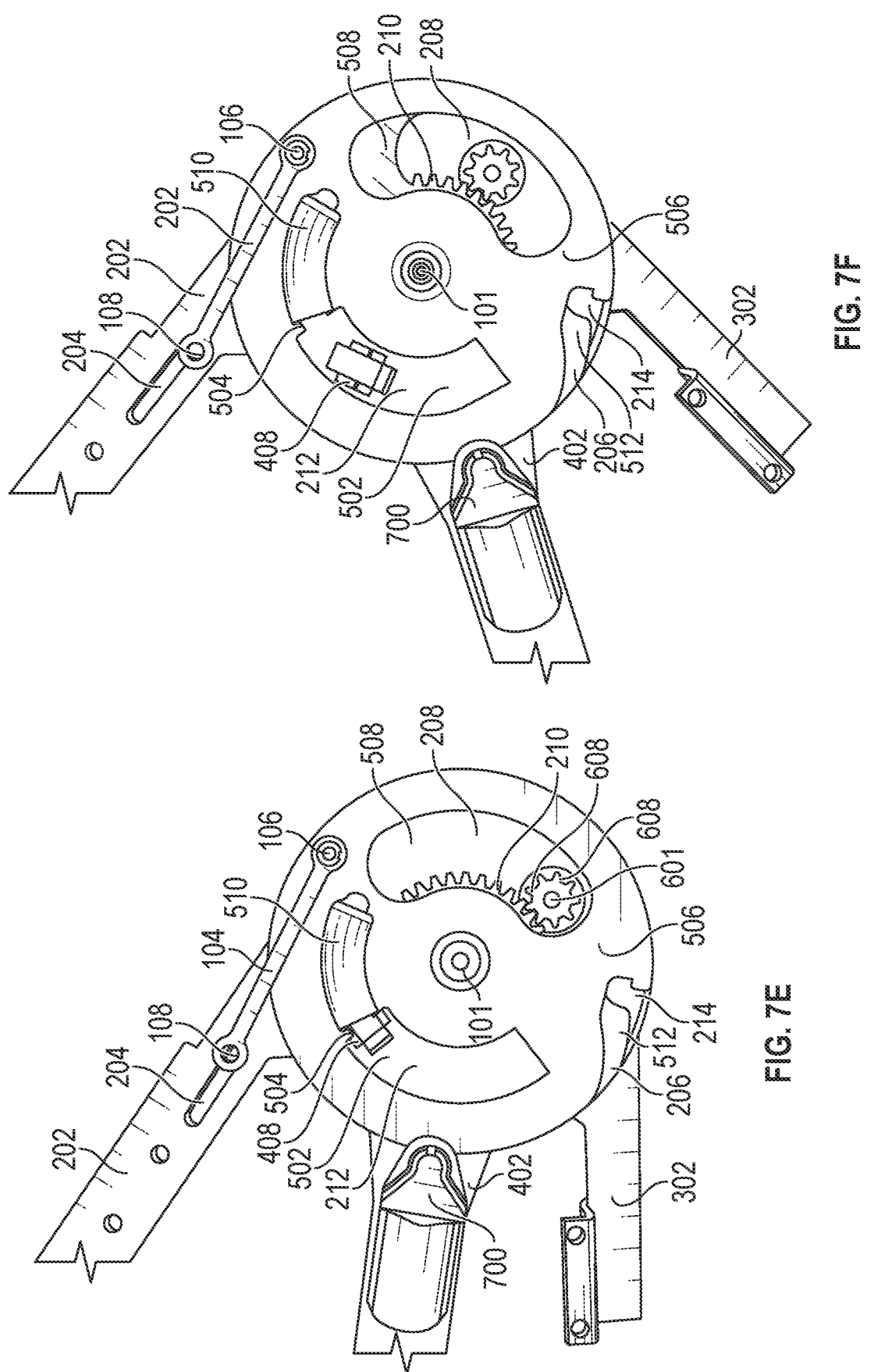

In addition to the spring force of the compression spring within cover 510, tabs 408 may facilitate transitioning of unlock plate 500 towards its locked configuration relative to front leg plate 300 and handle plate 200, such that grooves 214 and 314 are aligned with groove 512 of unlock plate 500 while foldable hub 100 is in the folded configuration, as shown in FIG. 7E. To transition foldable hub 100 back to the unfolded configuration, handle plate 200 may be rotated in the clockwise direction to thereby cause pinion 600 to rotate in a counter-clockwise direction about axis 601, and in a counter-clockwise direction about axis 101 along rack 210, which causes front leg plate 300 to rotate in a direction opposite to that of handle plate 200, as shown in FIG. 7F. Handle plate 200 may be rotated until tabs 408 engages with the radially extending edge of opening 212 and opening 502, such that folding hub 100 is in the unfolded configuration.

One or more illustrative embodiments of the disclosure have been described above. The above-described embodiments are merely illustrative of the scope of this disclosure and are not intended to be limiting in any way. Accordingly, variations, modifications, and equivalents of the embodiments disclosed herein are also within the scope of this disclosure.

While the present disclosure has been described with reference to a number of embodiments, it will be understood by those skilled in the art that the invention is not limited to such disclosed embodiments. Rather, the invention can be modified to incorporate any number of variations, alterations, substitutions, or equivalent arrangements not described herein, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A foldable hub comprising:
a first plate having a first opening defining a first curved pathway comprising a first rack, and configured to rotate about a hub axis;
a second plate concentric with the first plate, the second plate having a second opening defining a second curved pathway comprising a second rack, and configured to rotate about the hub axis;
a third plate concentrically disposed between the first and second plates, the third plate comprising an opening sized and shaped to rotatably receive the pinion therethrough; and
a pinion extending between the first curved pathway and the second curved pathway, and configured to engage with the first rack and the second rack and to rotate about a pinion axis, the pinion axis fixed relative to the hub axis,
wherein the pinion comprises a positive profile shift such that rotation of the first plate in a first direction about the hub axis causes rotation of the pinion about the pinion axis in a second direction opposite to the first direction via the first rack, which causes rotation of the second plate in the second direction about the hub axis via engagement between the pinion and the second rack with increased torque transmission.

2. The foldable hub of claim 1, wherein the first rack extends along an inner edge of the first curved pathway, and wherein the second rack extends along an outer edge of the second curved pathway.

3. The foldable hub of claim 1, wherein a rack and pinion system comprising the first and second racks and the pinion is designed with a distance between the hub axis and the pinion axis, such that the positive profile shift of the pinion improves torque transmission from the pinion to the second rack.

4. The foldable hub of claim 1, wherein the third plate is formed of a metal and comprises an integrated arm extending therefrom.

5. The foldable hub of claim 4, wherein the third plate is formed of steel.

6. The foldable hub of claim 1, wherein the first plate further comprises a third opening defining a third curved pathway, wherein the second plate further comprises a fourth opening defining a fourth curved pathway, and wherein the third plate further comprises:
a first set of one or more integrated tabs extending toward the first plate, and slidably disposed within the third curved pathway; and
a second set of one or more integrated tabs extending toward the second plate, and slidably disposed within the fourth curved pathway,
wherein the first set of one or more integrated tabs is configured to prevent over rotation of the first plate relative to the third plate, and
wherein the second set of one or more integrated tabs is configured to prevent over rotation of the second plate relative to the third plate.

7. The foldable hub of claim 1, further comprising a locking mechanism configured to transition between a locked state where rotation of the first and second plates relative to the third plate is prohibited, and an unlocked state where rotation of the first and second plates relative to the third plate is permitted.

8. The foldable hub of claim 7, wherein the first plate further comprises a first groove extending inward from an outer edge of the first plate and having a first geometry, wherein the second plate further comprises a second groove extending inward from an outer edge of the second plate and having a second geometry corresponding with the first geometry, wherein the third plate further comprises a third groove having a third geometry corresponding with the first and second geometries, and wherein the locking mechanism comprises:
a locking pin having a geometry corresponding to at least a portion of the first, second, and third geometries, the locking pin configured to transition between the locked state where the locking pin is disposed within the first, second, and third grooves, and the unlocked state where the locking pin is disengaged from the first, second, and third grooves,
wherein the locking pin is configured to be biased towards the locked state.

9. The foldable hub of claim 8, wherein the geometry of the locking pin comprises a curved locking section and a tapered locking section extending from the curved locking section, the curved locking section and the tapered locking section configured to prevent relative movement between the first, second, and third plates when the locking pin is disposed within the first, second, and third grooves.

10. The foldable hub of claim 8, wherein the third plate comprises an arm extending therefrom, and wherein the third groove comprises a channel extending along the arm, the channel configured to slidably receive the locking pin therein.

11. The foldable hub of claim 8, further comprising a compression spring coupled to the locking pin, the compression spring configured to bias the locking pin toward the locked state.

12. The foldable hub of claim 8, further comprising a fourth plate concentrically coupled to the first plate, the fourth plate comprising:
a fifth opening defining a fifth curved pathway aligned within the first curved pathway; and
a fourth groove having a fourth geometry defining a cam path,
wherein the fourth plate is configured to be rotated between a locked configuration where the locking pin is engaged with a lock portion of the cam path such that the locking pin is disposed within the first, second, and third grooves, and an unlocked configuration wherein the locking pin is engaged with an unlock portion of the cam path such that the locking pin at least partially disengages with the first, second, and third grooves, to thereby permit rotation of the first and second plates relative to the third plate, and
wherein the fourth plate is biased towards the locked configuration.

13. The foldable hub of claim 12, wherein the locking pin comprises a locking slot, and wherein the fourth geometry of the fourth groove further defines a locking portion, such that in the locked configuration, the locking portion is engaged with the locking slot to prevent movement of the locking pin relative to the fourth plate.

14. The foldable hub of claim 12, further comprising a compression spring coupled to the first plate and the fourth plate, the compression spring configured to bias the fourth plate towards the locked configuration.

15. The foldable hub of claim 14, wherein the first plate comprises an integrated tab extending toward the fourth plate, and wherein the compression spring is coupled to the integrated tab of the first plate.

16. The foldable hub of claim 12, further comprising an actuator operatively coupled to the first plate and the fourth plate, the actuator configured to be actuated to cause rotation of the fourth plate from the locked configuration to the unlocked configuration.

17. A foldable hub comprising:

a first plate configured to rotate about a hub axis, the first plate having a first opening defining a first curved pathway comprising a first rack, and a second opening defining a second curved pathway;

a second plate concentric with the first plate and configured to rotate about the hub axis, the second plate having a third opening defining a third curved pathway comprising a third rack, and a fourth opening defining a fourth curved pathway;

a pinion extending between the first curved pathway and the third curved pathway, and configured to engage with the first rack and the third rack and to rotate about a pinion axis, the pinion axis fixed relative to the hub axis; and a third plate concentrically disposed between the first and second plates, the third plate comprising an opening sized and shaped to rotatably receive the pinion therethrough, and a first set of one or more integrated tabs extending toward the first plate and slidably disposed within the second curved pathway, and a second set of one or more integrated tabs extending toward the second plate, and slidably disposed within the fourth curved pathway, wherein the first set of one or more integrated tabs is configured to prevent over rotation of the first plate relative to the third plate, and wherein the second set of one or more integrated tabs is configured to prevent over rotation of the second plate relative to the third plate.

18. A foldable hub comprising:

a first plate configured to rotate about a hub axis, the first plate having a first opening defining a first curved pathway comprising a first rack, and a first groove extending inward from an outer edge of the first plate, the first groove having a first geometry;

a second plate concentric with the first plate and configured to rotate about the hub axis, the second plate having a second opening defining a second curved pathway comprising a second rack, and a second groove extending inward from an outer edge of the second plate, the second groove having a second geometry corresponding with the first geometry;

a pinion extending between the first curved pathway and the second curved pathway, and configured to engage with the first rack and the second rack and to rotate about a pinion axis, the pinion axis fixed relative to the hub axis;

a locking pin having a geometry corresponding to at least a portion of the first and second geometries, the locking pin configured to transition between a locked state where the locking pin is disposed within the first and second grooves, and an unlocked state where the locking pin is disengaged from the first and second grooves, the locking pin configured to be biased towards the locked state; and a third plate concentrically coupled to the first plate and configured to rotate about the hub axis, the third plate comprising a third opening defining a third curved pathway aligned within the first curved pathway, and a third groove having a third geometry defining a cam path, wherein the third plate is configured to be rotated between a locked configuration where the locking pin is engaged with a lock portion of the cam path such that the locking pin is disposed within the first and second grooves, and an unlocked configuration wherein the locking pin is engaged with an unlock portion of the cam path such that the locking pin at least partially disengages with the first and second grooves, to thereby permit rotation between the first and second plates, the third plate configured to be biased towards the locked configuration.

19. A foldable hub comprising:

a first plate configured to rotate about a hub axis, the first plate comprising:

a first opening defining a first curved pathway comprising a first rack;

a second opening defining a second curved pathway; and a first groove extending inward from an outer edge of the first plate, the first groove having a first geometry;

a second plate concentric with the first plate and configured to rotate about the hub axis, the first plate, the second plate comprising:

a third opening defining a third curved pathway comprising a second rack;

a fourth opening defining a fourth curved pathway; and a second groove extending inward from an outer edge of the second plate, the second groove having a second geometry corresponding with the first geometry;

a pinion extending between the first curved pathway and the second curved pathway, and configured to engage with the first rack and the second rack and to rotate about a pinion axis, the pinion axis fixed relative to the hub axis a third plate concentrically disposed between the first and second plates, the third plate comprising:

a first set of one or more integrated tabs extending toward the first plate, and slidably disposed within the second curved pathway;

a second set of one or more integrated tabs extending toward the second plate, and slidably disposed within the fourth curved pathway; and a third groove having a third geometry corresponding with the first and second geometries;

a locking pin having a geometry corresponding to at least a portion of the first, second, and third geometries, the locking pin configured to transition between a locked state where the locking pin is disposed within the first, second, and third grooves, and an unlocked state where the locking pin is disengaged from the first, second, and third grooves, the locking pin configured to be biased towards the locked state; and a fourth plate concentrically coupled to the first plate and configured to rotate about the hub axis, the fourth plate comprising:

a fifth opening defining a fifth curved pathway aligned within the first curved pathway;

a sixth opening defining a sixth curved pathway aligned with the second curved pathway;

a fourth groove having a fourth geometry defining a cam path, wherein the fourth plate is configured to be rotated between a locked configuration where the locking pin is engaged with a lock portion of the cam path such that the locking pin is disposed within the first, second, and third grooves, and an unlocked configuration wherein the locking pin is engaged with an unlock portion of the cam path such that the locking pin at least partially disengages with the first, second, and third grooves, to thereby permit rotation of the first and second plates relative to the third plate, the fourth plate configured to be biased towards the locked configuration.

\* \* \* \* \*